United States Patent
Rasner et al.

(10) Patent No.: US 6,745,720 B2
(45) Date of Patent: Jun. 8, 2004

(54) CLUMPING ANIMAL LITTER AND METHOD OF MAKING SAME

(75) Inventors: Kobi Rasner, Tel-Aviv (IL); Nimrod Eitan, Tel-Aviv (IL); Ziv Gilo, Alon Agalil (IL)

(73) Assignee: Cycle Group Limited of Delaware, Mocksville, NC (US)

( * ) Notice: Subject to any disclaimer, the term of this patent is extended or adjusted under 35 U.S.C. 154(b) by 0 days.

(21) Appl. No.: 10/282,043

(22) Filed: Oct. 29, 2002

(65) Prior Publication Data

US 2004/0079293 A1 Apr. 29, 2004

(51) Int. Cl.⁷ .............................. A01K 29/00
(52) U.S. Cl. .................. 119/172; 119/171; 119/173
(58) Field of Search ...................... 119/172, 173, 119/171; 502/400

(56) References Cited

U.S. PATENT DOCUMENTS

| | | | |
|---|---|---|---|
| 4,157,696 A | * 6/1979 | Carlberg | 119/172 |
| 4,949,672 A | * 8/1990 | Ratcliff et al. | 119/173 |
| 5,097,799 A | 3/1992 | Heitfeld et al. | |
| 5,129,365 A | 7/1992 | Hughes | |
| 5,176,108 A | 1/1993 | Jenkins et al. | |
| 5,183,655 A | 2/1993 | Stanislowski et al. | |
| 5,209,185 A | * 5/1993 | Chikazawa | 119/171 |
| 5,303,676 A | * 4/1994 | Lawson | 119/173 |
| 5,329,880 A | 7/1994 | Pattengill et al. | |
| 5,361,719 A | 11/1994 | Kiebke | |
| 5,415,131 A | * 5/1995 | Dodman | 119/171 |
| 5,469,809 A | 11/1995 | Coleman | |
| 5,609,123 A | 3/1997 | Luke et al. | |
| 5,664,523 A | * 9/1997 | Ochi et al. | 119/173 |
| 5,724,915 A | * 3/1998 | Ochi et al. | 119/173 |
| 5,743,213 A | * 4/1998 | Fujiura | 119/172 |
| 5,975,019 A | * 11/1999 | Goss et al. | 119/173 |
| 5,992,351 A | * 11/1999 | Jenkins | 119/173 |
| 6,030,565 A | 2/2000 | Golan | |
| 6,039,004 A | * 3/2000 | Goss et al. | 119/172 |
| 6,089,189 A | 7/2000 | Goss et al. | |
| 6,194,065 B1 | 2/2001 | Golan | |
| 6,207,143 B1 | 3/2001 | Lezdey et al. | |
| 6,287,550 B1 | 9/2001 | Trinh et al. | |
| 6,371,050 B1 | * 4/2002 | Mochizuki | 119/172 |
| 6,405,678 B2 | * 6/2002 | Ikegami et al. | 119/171 |
| 2002/0007800 A1 | * 1/2002 | Ochi et al. | 119/171 |

FOREIGN PATENT DOCUMENTS

JP 11032608 A * 2/1999 .......... A01K/1/015

* cited by examiner

Primary Examiner—Peter M. Poon
Assistant Examiner—Joan M. Olszewski
(74) Attorney, Agent, or Firm—Birch, Stewart, Kolasch & Birch, LLP.

(57) ABSTRACT

Animal litter composed of plural discrete particles that are dual component granules. Each of the absorbent granules of this invention is made up of an inner core and an external coating complex. The inner core of the granule may be made with natural or artificial fibers, mineral filler, and binder. The coating of the granule may be made with an agglomerating agent and with natural or artificial materials that reduce odors and/or prevent the formation of malodors. The external coating layer may consists essentially of bentonite, zeolite and/or boric acid, and, optionally, fine cellulose fibers. The granules of this invention agglomerate into clumps when wetted. The highly absorptive and lightweight litter of this invention substantially reduces litter box malodors, extends usage duration of a given cat litter volume unit, and increases consumer convenience by substantially reducing the weight of the product in conventionally sized packaging.

18 Claims, 1 Drawing Sheet

CLUMPING ANIMAL LITTER AND METHOD OF MAKING SAME

FIELD OF THE INVENTION

This invention relates to cellulose-based animal litter products, and in particular to clumping-type animal litters comprising cellulose-based core particles that are covered with specially designed water-permeable coatings.

BACKGROUND OF THE INVENTION

American families increasingly prefer cats, with their independent natures and reduced need for care, as compared with dogs. Domesticated animals such as cats are provided in homes with litter boxes, where they dispose of their biological waste. The performance of the litter product in the litter box can vary greatly, depending upon the precise nature of the product. Key attributes of a litter product that are of importance to cat owners are odor control and litter care convenience (that is, supply and removal).

Originally litter products were relatively unsophisticated, and of the type known today as "non-clumping". More recently, clumping type cat litters have been introduced. Both types are essentially equivalent with respect to the removal of solids. With both types, solid excretions are scooped out of the litter box daily or at least frequently. However, clumping litters provide great advantages with respect to the way in which urine excretion is handled. Non-clumping litters absorb the urine and hold it until ammonia-type malodors develops, at which time the entire content of the litter box is removed and replaced. Clumping litters, however, are designed to gel when wetted by urine, and the urine soaked granules agglomerate into clumps whose mechanical strength facilitates their removal in the same manner as solid waste is removed, leaving the remaining litter fresh and urine-free.

Litter products have been made with natural substrates or artificial substrates. Natural substrates that have been used include minerals, usually types of clay, or organic matter, usually agricultural byproducts or paper derivatives. Artificial litter particles have generally comprised granules combining several materials of an absorbent nature, aggregated together with a binder to form a granule. These prior art aggregated granules are of a single component nature—that is, all their ingredients are mixed together into one more or less homogeneous entity.

Clumping litters made from bentonite were introduced in 1989, providing better and longer lasting odor control than did traditional litters. Bentonite is a swelling mineral of the clay category, with a unique ability to gel and agglomerate when wetted, creating scoopable clumps. However, mineral based clumping litter are heavy and dusty. While their innate absorption, clumping, and odor control attributes are good, further performance improvement by solid and/or liquid additives is limited.

Organic based clumping litters, on the other hand, make use of the improved absorption capabilities of cellulose fibers. Unfortunately, they have minimal innate clumping properties, and require the addition of clumping agents such as starches and/or polymers. These clumping additives produce litters with much less clumping effectiveness than that of the mineral variety. This lesser clumping performance is apparent from their reduced speed of effective agglomeration, their reduced mechanical strength of the clump, and their duration of cohesion forces in the clumped matter. However, organic clumping litters are lighter in weight, are less dusty, and are flushable, which makes their use more convenient.

U.S. Pat. Nos. 4,949,672; 5,129,365; 5,329,880; 5,361,719; 5,469,809; 5,609,123; and 6,089,189 are typical of patents relating to clumping litters.

U.S. Pat. No. 4,949,672 relates to the use of boron-containing compounds (especially, boric acid) as a urease inhibitor in clumping cat litter. The boric acid is used as a superficial liquid additive, rather than being built into the substrate. The patent claims a method of controlling odor formation in animal litters comprising applying a liquid carrier to particles of absorbent litter substrate, said liquid carrier containing an odor-controlling-effective amount of a boron containing material having an equal boron level of at least about 0.06%.

U.S. Pat. No. 5,129,365 discloses a bentonite-based clumping litter. The odor control performance of such a litter is derived from its natural properties or by commingling odor-control particles with it or by spraying it superficially with odor-control liquids. One disclosed embodiment comprises discrete particles of a combination of non-compacted water-swellable sodium bentonite clay and calcium bentonite clay that effectively absorbs animal dross and simultaneously agglomerates into a water-dispersible but physically stable mass, thereby permitting physical separation of the soiled and wetted bentonite clay particles from discrete particles of the unsoiled and unwetted water-swellable bentonite clay. All ingredient particles in this invention are relatively large, and thus "mixing" means between the granules themselves and not within a granule. The mixing of calcium bentonite with sodium bentonite weakens the clump but enables it to be flushable.

U.S. Pat. No. 5,329,880 describes a litter in which a mixture of hydrophilic shale may contain up to 10% clumping agent selected from water absorbent polymers, corn starch, gelatin, gluten, and dried plants of the Plantago family. It is further disclosed that, in addition, 5–25% ammonia-absorbing zeolite may be added for odor control. All ingredient particles in this invention are relatively large, and thus "mixing" means between the granules themselves and not within a granule.

U.S. Pat. No. 5,361,719 disclosed a hydrating cat litter which solidifies upon contact with liquids to encapsulate pet waste matter. The litter comprises a mixture of a granulated, organic base material (preferably coarse ground agricultural grains, pulse crops, and/or agricultural byproducts, which support in suspension a quantity of semolina), a gluten-containing material, and optionally a fragrance carrier.

U.S. Pat. No. 5,469,809 describes a single-component granule that combines bentonite and other minerals into an artificial substrate (which contains no fibers). The patent teaches a process that comprises forming a mixture of opal clay with one or more of sodium bentonite, calcium lignosulfonate, and binder, and subsequently pelletizing the mixture.

U.S. Pat. No. 5,609,123 uses superabsorbing polymer as an agglomeration agent on a natural clay substrate. The superabsorbent polymer is sprayed externally and not incorporated as part of a coating complex. The patent claims a method that comprising spraying particulate substrate with a surface-bonding, non-aggregating, amount of moisture, allowing the sprayed moisture to be absorbed onto the surface of the substrate, and mixing the substrate with superabsorbent particles and with clumping particles.

U.S. Pat. No. 6,089,189 discloses cellulose-based clumpable animal litter products that comprise a mixture of adhesive-bearing cellulosic granules and a particulate polymeric clumping agent. The patent claims a process that comprises de-dusting cellulosic granules, contacting the de-dusted granules with water-soluble adhesive, drying the adhesive-bearing granules to a free-flowing state, and combining the dried granules with a particulate polymeric clumping agent to form a uniform admixture. None of these granules has a designed structure, and all ingredient particles in this invention are relatively large, so that "mixing" means between the granules themselves and not within a granule.

Applicants are unaware of any prior art that teaches animal litter granules comprising a multi-component functional core coated with a multi-component coating having different functional attributes, as described hereinbelow.

SUMMARY OF THE INVENTION

The animal litter of the present invention comprises plural discrete particles which are dual component granules. That is, in accordance with this invention, an absorbent granule is made up of an inner core and an external coating complex. Both the core and the coating comprise aggregates of (different) dry fine powdered materials. The granules of this invention are designed to agglomerate into clumps when wetted. The highly absorptive and lightweight litter of this invention substantially reduces litter box malodors, extends usage duration of a given cat litter volume unit, and increases consumer convenience by substantially reducing the weight of the product in conventionally sized packaging.

Preferably, the inner core of the granule is made with natural or artificial fibers, mineral filler, and binder. More preferably, the fibers in the core are cellulose fibers, most preferably, fine wood fibers. Preferably, the coating of the granule is made with an agglomerating agent and with natural or artificial materials that reduce odors and/or prevent the formation of malodors. More preferably, the coating is mineral or organic or a combination thereof. Most preferably, the external coating layer consists essentially of bentonite, zeolite and/or boric acid, and, optionally, fine cellulose fibers.

In a further embodiment of the present invention, a bactericide, a pH buffer, a deodorizer, a perfume, and/or a de-dusting agent may be sprayed onto the coating layer of the litter granule.

This invention also includes a process for producing the dual constituent absorbent granules. More specifically, this invention provides a process for preparing dual-component granules from fine dry powdered materials, including the preparation of discrete dry mixes for the core and for the coating complex and their subsequent sequential multi-stage arrangement in a predetermined spatial relationship.

Materials that may be employed in practicing the present invention are known for their capabilities to contribute to the task of controlling malodors, and some have previously been used in prior art clumping litters. The present invention is distinguished from such prior art, however, by the novel structure of the disclosed dual-component granule, by its unique powder-only recipes, and by the unique multi-stage process for manufacturing it.

Specifically, this invention provides an animal litter granule formed as a coated core. The core includes 15–45 weight-% dry cellulose fine fibers, 40–80 weight-% dry mineral filler, and 0.5–10 weight-% binder. The coating has a mass that is 0.5–2 times the mass of the core and includes 65–99 weight-% clumping agent, up to 30 weight-% dry cellulose fine fibers, and 1–25 weight-% zeolite or 1–3 weight-% of a boron compound (urease inhibitor) or both of these last two ingredients. The coating may alternatively include 65–94 weight-% clumping agent and 5–30 weight-% dry cellulose fine fibers as well as 1–15 weight-% zeolite and/or 1–3 weight-% of a boron compound.

In the granules of this invention, the coating generally has a mass that is comparable to the mass of the core. That is to say, the mass of the coating of each granule is of the same order of magnitude as is the mass of the core.

The dry cellulose fine fibers in the core (and any cellulose fibers in the coating) typically have a length of 1–3 millimeters and have a moisture content of less than 15 weight-%. These cellulose fibers are preferably selected from the group consisting of wood dust, paper fibers, organic fibers, and mixtures thereof. In the cores of the granules of this invention, the dry mineral filler typically has a particle size range within the range 10 to 150 microns, and has a moisture content of less than 12 weight-%. The mineral filler is preferably selected from the group consisting of lime, fly ash, dolomite, calcium carbonate, and mixtures thereof. The binder in the core is typically selected from the group consisting of starch, acrylic polymer, polyvinyl acetate, guar gum, and mixtures thereof. Most preferably, the binder is unmodified starch granules, 70% of which pass through 200 Mesh U.S. Sieve Series.

In the coating, the clumping agent is normally selected from the group consisting of bentonite clay, starch, and superabsorbent polymer. Typically, the bentonite clay is a sodium montmorillonite having a particle size distribution such that 80% of the particles pass through 200 Mesh U.S. Sieve Series and having a moisture content of less than 12 weight-%. The zeolite component of the coating is most preferably a clinoptilolite having a particle size range within the range 10 to 100 microns and having a moisture content of less than 12 weight-%. The boron compound in the coating is most preferably a boric acid having a particle size range within the range 10 to 100 mesh, U.S. Sieve Series, and having a moisture content of less than 10 weight-%.

The process of this invention produces a highly structured granule with two different sets of functional components. Each of the components is differently formulated and the process places each material in a spatially predetermined position where its performance objectives come into play in an optimal manner. Another important advantage of the present invention is the flexibility and freedom that it provides in changing and "playing with" the formulation, both in the core and in the coating, in order to change ratios between ingredients for achieving desirable specific performance levels for each product performance parameter. The resulting 100% uniform granules deliver unprecedented odor control as well as highly effective agglomerating capabilities.

BRIEF DESCRIPTION OF THE DRAWINGS

The present invention will be more fully understood from the detailed description give hereinbelow and by reference to the accompanying drawings. The drawings are provided by way of illustration only and are not intended to limit the invention.

DETAILED DESCRIPTION OF THE INVENTION

Figure 1:
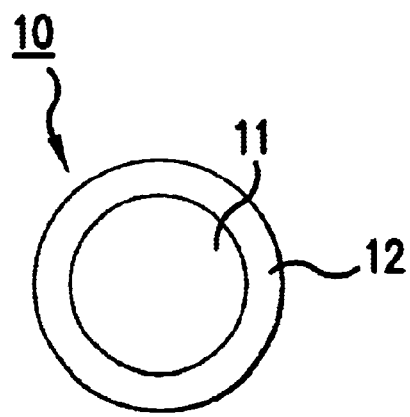
FIG. 1 schematically depicts a cross-section of a coated litter granule of the present invention.

The products of the present invention are clumping animal litters composed of a plurality of discrete, dual-component, artificial granules. The coated litter granules of this invention are depicted schematically in FIG. 1, which shows a cross-section of a granule 10 that comprises a core 11 surrounded by a coating 12. The granules of this invention deliver excellent levels of malodor absorption, adsorption, and prevention. They agglomerate with neighboring granules when wet, forming cohesive clumps that are strong enough mechanically to be easily scooped away from a litter box for disposal.

This invention provides an animal litter granule that has the form of a coated core. The core component is made up of 15–45 weight-% dry cellulose fine fibers, 40–80 weight-% dry mineral filler, and 0.5–10 weight-% binder. The coating component contains 65–99 weight-% clumping agent, 1–25 weight-% zeolite, and/or 1–3 weight-% of a urease inhibitor, which is generally a boron compound such as boric acid. The coating component may also contain up to 30 weight-% dry cellulose fine fibers. In the granules of the present invention, the coating component has a mass that may range from half to twice the mass of the core. Typically, however, the mass of the coating component in a granule is very roughly approximately equal to the mass of the core component in the granule.

The term "granule," as used herein, refers to any particulate form of matter such as particles, chips, pellets, and the like. The granules of the present invention generally have a mean particle size in the range of about 0.25 to about 4.75 millimeters, that is, from about 60 mesh to about 4 mesh, U.S. Sieve Series. For a tabulation of U.S. Sieve Series screen nomenclature, see Perry's Chemical Engineering Handbook, 6th Ed., McGraw-Hill, Inc., New York, N.Y. (1984), p. 21–15 (Table 21–6).

THE CORES

The functional role of the core in the litter granules of this invention is to provide structural support for the coating component of the granules. The core also serves to absorb liquid excretions as well as to chemically bind malodor-producing nitrogen and sulfur compounds deposited in a body of litter. The core is made of a dry mix of fine fibers, minerals, and binder. The small particle size of these ingredients optimize their mixing within the core, creating a homogenous structure. In addition to these basic core components, other malodor suppression materials such as Iuka and/or cyclodextrenes may be included within the core.

The cellulose fibers serve both as a structural skeleton as well as being highly absorbent materials. The cellulose fibers are very effective malodor reducers, due to their low pH (below 6.0) and to their high binding capabilities with sulfur compounds. They also contribute to the formation of cavities (pores) within the cores, thus reducing product weight. The fiber size distribution of the cellulose fibers in the core should be such that the combination of short and long fibers will contribute to the development of a strong yet open structure that will allow liquids to penetrate into the core. The dry cellulose fine fibers in the core and any cellulose fibers in the coating generally have a length of at most 5 millimeters, typically from 1–3 mm, and have a moisture content of less than 15 weight-%. Generally, the dry cellulose fine fibers are wood dust, paper fibers, organic fibers, and mixtures thereof. Any absorptive fiber, natural or artificial, though, may in principle be used for this purpose. However, wood or paper fibers, particularly those recovered from waste sources, function well and often have cost advantages.

The mineral in the core is a filler which gives the granule its desired specific weight. Fillers that may be used include kaolin, titanium dioxide, calcium carbonate, sodium bicarbonate, and mixtures thereof. In a preferred embodiment of the invention, this filler is a lime derivative, e.g., lime itself, fly ash, dolomite, calcium carbonate, and mixtures thereof, although any inert, low pH mineral, that has a high specific weight, is white or light in color, and is capable of supplying fine particles, will do. Calcium carbonate is currently preferred. Generally, the dry mineral filler has a particle size range within the range 10 to 150 microns, and has a moisture content of less than 12 weight-%. Preferably, at least 75% of the mineral filler particles pass through 200 Mesh U.S. Sieve Series.

The binder assists the cellulose fibers in providing structural form to the granule cores, and also increases the absorbency thereof. One or more than one binder material may be used. Binders may be selected from amongst organic binders, synthetic binders, and polymeric binders including superabsorbent polymers. Typical binders that may be used in this invention include starch, acrylic polymer, polyvinyl acetate, guar gum, and mixtures thereof. It is currently preferred to employ a starch that dissolves well in cold water as the binder. More preferably, the binder is constituted of unmodified starch granules, at least 70% of which pass through 200 Mesh U.S. Sieve Series.

THE COATINGS

The function of the coating complex in this invention is to enable quick initial liquid absorption and solid clumping and to lock in malodors arising from the liquid-soaked core once a clump is created. In addition, the coating complex functions to prevent malodor through urease inhibition and malodor adsorption. The coating is made of a dry mix of fine particles, which may include one or more of clumping agents, odor adsorption minerals, urease inhibitors, pH buffers, and cellulose fibers.

In accordance with the present invention, the coating component may comprise 75–99 weight-% clumping agent and 1–25 weight-% zeolite, or 97–99 weight-% clumping agent and 1–3 weight-% of a urease inhibitor, or 65–94 weight-% clumping agent and 5–30 weight-% dry cellulose fine fibers and 1–15 weight-% zeolite and/or 1–3 weight-% of a urease inhibitor. A particularly preferred coating complex of the present invention comprises sodium bentonite, wood fibers, zeolite, and boric acid.

The clumping agent in the coating formulation herein is preferably selected from the group consisting of bentonite clay, starch, and superabsorbent polymer, with bentonite clay being particularly preferred. Typically, the bentonite clay is a sodium montmorillonite having a particle size distribution such that 80% of the particles pass through 200 Mesh U.S. Sieve Series and having a moisture content of less than 12 weight-%. This particle size and moisture profile facilitates binding of the coating complex to the humid fibrous core during the coating application stage in the manufacturing process. The fine bentonite powder acts as a malodor control agent as well as a clumping agent.

A key innovation embodied in the present invention is that it requires the use of substantially less clumping agent such as bentonite than do prior art clumping litters where bentonite is the primary absorption substrate. The reduction in the amount of the relatively costly bentonite constituent of the litter product without corresponding loss of clumping effectiveness provides substantial economic benefits. Also in accordance with the present invention, clumping performance can be controlled in advance by varying the relative amount of bentonite or other clumping agent in the granules produced. Relatively solid, hard clumps will require a higher proportion of clumping agent, while clumps designed to be flushable (that is, to disintegrate during a flushing operation) well require a lower proportion of clumping agent. Other key innovations that characterize the present invention include longer useful life and better odor control due to reduced clump size and increased absorption speed, and improved adsorption of sulfur compounds due to the structure and cellulose fiber content of the granules of this invention.

A urease inhibitor such as boric acid may be mixed into the coating complex to prevent hydrolysis of urine to urea and volatile ammonia, which occurs when urease-producing bacteria are present. In accordance with this aspect of the present invention, the boron compound in the coating is boric acid having a particle size range within the range 10 to 100 mesh, U.S. Sieve Series, and having a moisture content of less than 10 weight-%.

Zeolites have high cation exchange capacities as well as natural capabilities to act as molecular sieves. In this invention, they may be used to trap and bind ammonium ions. In the present invention, therefore, zeolite may be used to complement the role of boric acid as a urease inhibitor, by trapping and absorbing volatile ammonia and preventing it from evaporating into the environment where the animal litter is deployed. A zeolite that is especially useful in the present invention is clinoptilolite having a particle size range within the range 10 to 100 microns and having a moisture content of less than 12 weight-%.

Low pH cellulose fibers, used in the coating complex of the present invention, are preferably wood fibers. They provide a multitude of benefits to the overall performance: 1) They serve as a channeling mechanism to better convey liquids from the coating to the core. 2) They reduce the amount of bentonite or other clumping agent needed for the creation of a solid clump. 3) They reduce air-borne dust in the finished product. 4) They reduce coating pH. 5) They bind sulfur compounds, thus reducing sulfur malodors.

The pH of sodium bentonite is approximately 9–10. At this pH, ammonia tends to be present in its volatile gaseous form rather than in the form of non-volatile ammonium ions. The use of a pH buffer such as baking soda (sodium bicarbonate) is intended to maintain the pH at a low level, that is, pH 8.1 or lower, thus reducing the amount of gaseous ammonia present.

Coating complexes made in accordance with the present disclosure, for instance of sodium bentonite, zeolite, boric acid, and cellulose fibers, achieve very high functional efficiency. Each portion of the homogeneous coating acts to clump and to fight the formation of malodors. These additives are all relatively costly, but the present invention provides for their application in small quantities, applied as they are in the outer layers of the absorbent granules of the present invention, and thereby obtains maximum benefit from the materials employed.

THE PROCESSES

The present invention also contemplates a method of making an animal litter granule as described above. The method of the invention includes the steps of: preparing a homogenous core mixture comprising dry cellulose fine fibers, dry mineral filler, and binder; wetting and agglomerating that mixture to prepare wet agglomerated core particles; preparing a homogenous coating mixture comprising bentonite clay and zeolite and/or a boron compound; applying the coating mixture to the wet agglomerated core particles to prepare coated wet agglomerated core particles; and drying the coated particles to prepare the desired animal litter granules.

Figure 2:
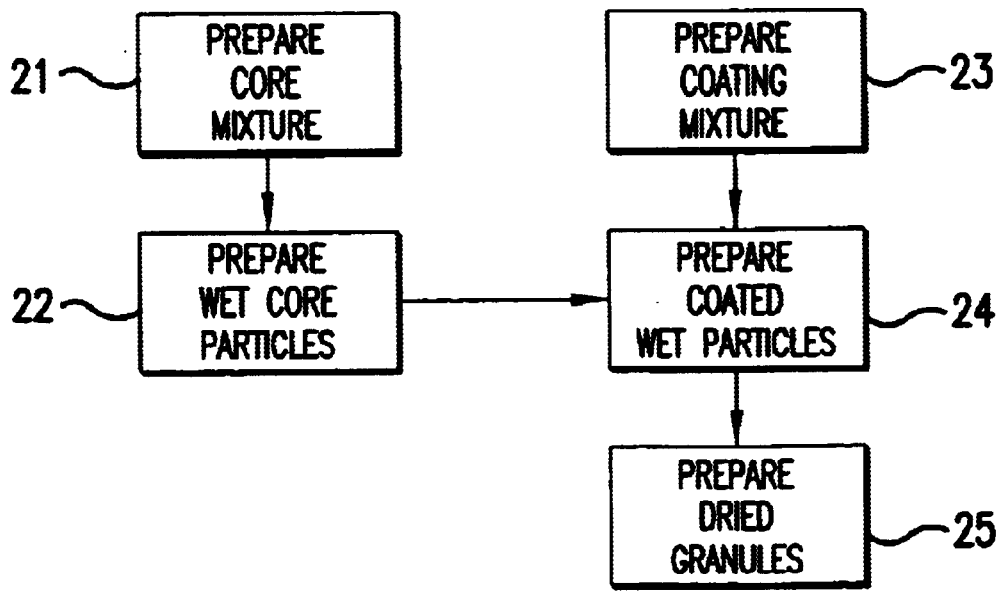
FIG. 2 is a block diagram of an overall manufacturing process for making the coated litter granules of the present invention.

FIG. 2 is a block diagram depicting an overall manufacturing process for making the coated litter granules of the present invention. In FIG. 2, a homogenous core mixture is prepared in block 21 and is subsequently wetted and agglomerated to prepare the wet core particles of block 22. Separately, a homogenous coating mixture is prepared in block 23, and then in block 24 is applied to the wet core particle to prepare coated wet particles. Finally, the coated wet particles of block 24 are dried to prepare the granules of the invention in block 25.

An optional variant of the present invention includes a step making pelletized cores that can be used in the manufacture of the coated litter granules of the invention. In this variant, a homogenous core mixture is prepared and then is palletized and the pellets are screened. More specifically, this invention contemplates a method for making a core pellet suitable for use in manufacturing an animal litter granule, which method includes the steps of: forming a mixture comprising 15–45 weight-% dry cellulose fine fibers, 40–80 weight-% dry mineral filler, and 0.5–10 weight-% binder; pelletizing the mixture in a disc pelletizer to form substantially spherical pellets; and screening the pellets to select pellets which, for instance, pass a 6 mesh screen but are retained on at 30 mesh screen. Referring to the overall manufacturing process of this invention as described above, the core pellets can be used to prepare the wet core particles.

The process of this invention includes several manufacturing stages, namely: dry blends preparation; agglomeration; wet screening; coating; drying; dry screening; recycling; and spraying.

Dry Blends Preparation. In this stage, a bulk mixture of components in the desired weight ratios is prepared. Both the core components and the coating components are prepared, separately of course, in this way. Each scheduled component is dosed in its turn from a weighing station into a hopper. Once all of the components are in the hopper, the unmixed batch is conveyed to a mixer. The components, which at this point differ in bulk density and texture, require intensive mixing to achieve a good mix. A typical mixing procedure mixes each batch for from 90 to 120 seconds in a plowshare high-speed mixer. Once well mixed, each batch is conveyed to a surge and combined with other batches having the same component weight ratios. The coating mixture can be mixed in a continuous mixture to be fed directly to the pre-mix auger.

Agglomeration. This stage creates core granules from a dry blend of core components. Dry blend is dosed continuously into a pin mixer. At the same time, water is injected into the pin mixer at several different locations. High-speed rotation of the wetted blend within the pin mixer creates "seeds" or small particles of the blended materials. The wetted blend is then transferred to an agglomeration pan, where agglomeration is completed. In the agglomeration pan, more material accumulates around each seed, creating a core granule. Parameters such as granule size and weight can be controlled in this stage by changing the blend/water ratio as well as by changing the speed and/or inclination of the pin mixer and/or the agglomeration pan.

Wet Screening. By the time the smaller core granules are large enough for further processing, it is often found that some of the core granules have generally become too large for use in the present invention. In this case, all of the granules are passed through a screener in order to screen out the oversized particles. Measures known to those skilled in the art can be employed to ensure that the screener is not "blinded" by the wet granules. This step can be omitted when the percentage of oversized granules is small. The oversized granules are crushed and then recycled to the Agglomeration stage.

Coating. In this stage, the core granules are coated with the clumping agent-based coating complex to provide dual-component coated granules in accordance with the present invention. The core granules, still wet, are fed into a high-speed pre-mix auger together with a dry blend coating complex mixture which has been prepared as described above. From the auger, the mixed product, consisting of core granules and dry blend coating mixture, are transferred into a coater. The coater is for instance a horizontal drum rotating around its axis. The internal walls of the drum have helical, screw-like threads. The mixed products falls into the rotating threads and rolls, which causes the coating mixture to wrap the granule. Moisture present in the granules from the agglomeration stage causes the dry blend coating mixture to stick to the granules. As the mixed product moves through the coater, more and more coating adheres to each granule until the desired mass ratio of coating to core is achieved. Parameters including the speed and angle and feeding location of the pre-mix auger and the coating drum are controllable and can be optimized by those skilled in the art.

Drying. In this stage, wet coated granules are dried to reach their final moisture level. Perforated belt dryers are employed to remove the necessary amount of moisture from each granule. The desired final moisture content, generally from about 7% to about 12%, is achieved by controlling the air temperature and granule throughput in the dryer.

Dry Screening. Once dried, the batch of granules of this invention is screened to remove both oversized granules and undersized granules, and to provide a litter product having a uniform granule size profile. Those skilled in the art are familiar with appropriate screening technology and the use of such devices as vibrating and rolling machines. The oversized and undersized granules are recycled to the Dry Blend Preparation stage.

Spraying. Additives such as de-dusting agents, antimicrobial agents, perfumes, and deodorizers can be spayed sprayed onto the finished product to improve dust control, shelf life, and product odor profile. Spraying is generally conducted in an enclosed spray chamber.

SPECIFIC FORMULATIONS

Typical specific formulations are set forth below. Those skilled in the art will recognize that the specific ingredients recited and their relative amounts can be varied widely while still making available the benefits provided by the present invention.

| [0057] Example #1 | | |
|---|---|---|
| | Percentages | |
| Core | In Core | In Product |
| Wood Fibers | 35% | 19.25% |
| Calcium Carbonate | 61% | 33.55% |
| Unmodified Starch | 4% | 2.2% |
| Total | 100% | 55% |

| -continued | | |
|---|---|---|
| | Percentages | |
| Coating | In Coating | In Product |
| Sodium Bentonite | 95% | 42.75% |
| Zeolite (clinoptilolite) | 5% | 2.25% |
| Total | 100% | 45% |
| | Core | Coating |
| Weight Ratio between core and coating | 55% | 45% |

| [0058] Example #2 | | |
|---|---|---|
| | Percentages | |
| Core | In Core | In Product |
| Wood Fibers | 32% | 19.2% |
| Calcium Carbonate | 64% | 38.4% |
| Unmodified Starch | 4% | 2.4% |
| Total | 100% | 60% |

| | Percentages | |
|---|---|---|
| Coating | In coating | In Product |
| Sodium Bentonite | 88% | 35.2% |
| Zeolite (clinoptilolite) | 5% | 2.0% |
| Wood Fibers | 7% | 2.8% |
| Total | 100% | 40% |
| | Core | Coating |
| Weight Ratio between core and coating | 60% | 40% |

BENEFITS

The product of the present invention is characterized by long lasting odor control, high absorbency, good clump integrity, low cost, and light weight. As such, it is superior to conventional animal litters.

What is claimed is:

1. An animal litter granule comprising a coated core, wherein
   the core comprises 15–45 weight-% dry cellulose fine fibers, 40–80 weight-% dry mineral filler having a moisture content of less than 12 weight-%, and 0.5–10 weight-% binder, and
   the coating has a mass that is 0.5–2 times the mass of the core and comprises 65–99 weight-% clumping agent, up to 30 weight-% dry cellulose fine fibers, and 1–25 weight-% zeolite and/or 1–3 weight-% of a boron compound.

2. The granule of claim 1, wherein the coating comprises 75–99 weight-% clumping agent and 1–25 weight-% zeolite.

3. The granule of claim 1, wherein the coating comprises 97–99 weight-% clumping agent and 1–3 weight-% of a boron compound.

4. The granule of claim 3, wherein said boron compound is a boric acid having a particle size range within the range 10 to 100 mesh, U.S. Sieve Series, and having a moisture content of less than 10 weight-%.

5. The granule of claim 1, wherein the coating comprises 65–94 weight-% clumping agent and 5–30 weight-% dry cellulose fine fibers and 1–15 weight-% zeolite and/or 1–3 weight-% of a boron compound.

6. The granule of claim 1, wherein the coating has a mass that is equal to the mass of the core.

7. The granule of claim 1, wherein the dry cellulose fine fibers in the core and any cellulose fibers in the coating have a length of 1–3 millimeters and have a moisture content of less than 15 weight-%.

8. The granule of claim 7, wherein the dry cellulose fine fibers are selected from the group consisting of wood dust, paper fibers, organic fibers, and mixtures thereof.

9. The granule of claim 1, wherein the dry mineral filler has a particle size range within the range 10 to 150 microns.

10. The granule of claim 9, wherein the dry mineral filler is selected from the group consisting of lime, fly ash, dolomite, calcium carbonate, and mixtures thereof.

11. The granule of claim 1, wherein the dry mineral filler is calcium carbonate.

12. The granule of claim 1, wherein the binder is selected from the group consisting of starch, acrylic polymer, polyvinyl acetate, guar gum, and mixtures thereof.

13. The granule of claim 12, wherein the binder is unmodified starch granules, 70% of which pass through 200 Mesh U.S. Sieve Series.

14. The granule of claim 1, wherein the clumping agent is selected from the group consisting of bentonite clay, starch, and superabsorbent polymer.

15. The granule of claim 2, wherein said zeolite is a clinoptilolite having a particle size range within the range 10 to 100 microns, and having a moisture content of less than 12 weight-%.

16. An animal litter granule comprising a coated core, wherein the core comprises 15–45 weight-% dry cellulose fine fibers, 40–80 weight-% dry mineral filler, and 0.5–10 weight-% binder, and the coating has a mass that is 0.5–2 times the mass of the core and comprises 75–99 weight-% bentonite clay clumping agent, up to 30 weight-% dry cellulose fine fibers and 1–25 weight-% zeolite.

17. An animal litter granule comprising a coated core, wherein core comprises 15–45 weight-% dry cellulose fine fibers, 40–80 weight-% dry mineral filler, and 0.5–10 weight-% binder, and the coating has a mass that is 0.5–2 times the mass of the core and comprises 97–99 weight-% bentonite clay clumping agent and 1–3 weight-% boron compound.

18. The granule of claim 16 or 17, wherein the bentonite clay is a sodium montmorillonite having a particle size distribution such that 80% of the particles pass through 200 Mesh U.S. Sieve Series and having a moisture content of less than 12 weight-%.

* * * * *